United States Patent [19]

Lacouture

[11] Patent Number: 5,201,344

[45] Date of Patent: Apr. 13, 1993

[54] EMISSIONS ELIMINATOR BLIND

[76] Inventor: Larry G. Lacouture, P.O. Box 77077, Baton Rouge, La. 70879

[21] Appl. No.: 736,943

[22] Filed: Jul. 26, 1991

[51] Int. Cl.⁵ .............................................. F16L 55/10
[52] U.S. Cl. ...................... 138/94.3; 138/44; 138/42
[58] Field of Search ............. 138/40, 42, 44, 94.3, 138/45

[56] References Cited

U.S. PATENT DOCUMENTS

| | | | |
|---|---|---|---|
| Re. 25,052 | 10/1961 | Burkland et al. | |
| 913,866 | 3/1909 | Wolcott et al. | |
| 1,150,141 | 11/1911 | Moore | |
| 1,164,033 | 12/1915 | Thomason | |
| 1,835,047 | 12/1931 | Hill | 138/42 |
| 2,278,849 | 12/1939 | Hamer | 251/167 |
| 2,462,731 | 10/1946 | Duggan | 285/205 |
| 2,614,423 | 10/1952 | Carbone | 73/211 |
| 3,695,299 | 10/1972 | Rodgers | 138/94.3 |
| 3,891,146 | 6/1975 | Blazek | 138/94.3 |
| 4,359,141 | 11/1982 | Schnell | 138/42 |
| 4,452,278 | 6/1984 | Quinn | 138/94.3 |

Primary Examiner—James E. Bryant, III
Attorney, Agent, or Firm—David L. Ray

[57] ABSTRACT

A pipe blind including a plate for connecting to the end of a pipe, the plate having an outer edge and two parallel faces, the plate having at least one channel therein, the channel being located in the interior of the plate and having an exit port and an entrance port, the entrance port being located on one of the faces of the plate and the exit port being located on the edge of the plate.

6 Claims, 4 Drawing Sheets

EMISSIONS ELIMINATOR BLIND

BACKGROUND OF THE INVENTION

1. Field of the Invention

The invention relates to high pressure pipelines. More particularly, the present invention relates to pipe blinds.

2. Description of the Related Art

Pipe blinds are known in the art. In the refining and petrochemical industry, blinds are used to completely stop the flow through a pipe in order to remove a piece of equipment from service. This piece of equipment could be a valve, heat exchanger, pipeline, distillation tower reactor, or the like. The blind insures that no combustible or toxic material will enter equipment or flow onto personnel working in or on equipment. Blinds are installed between the equipment being repaired and the first block valve or set of flanges upstream of the equipment.

One side of a blind is always considered to be live. This means that pressure is present, or the potential for pressure exists. Before a blind can be removed after the work is completed, the live side must be de-pressured. If no bleed valves exist between the blind and first block valve, the flange bolts at the blind must be loosened carefully to allow for the pressure to escape to the atmosphere. When a portion of a line has to be replaced, temporary bleed valves have to be installed at high and low points to allow for filling and bleeding off air when lines have to be hydrostatically tested before being put into service. High point bleeders are sometime left in place and the valve plugged to prevent valves from leaking to the atmosphere. When valves are removed, a plug is installed and backwelded to prevent leakage. Both of these methods are used today and both are potential sources of hydrocarbon emissions to the atmosphere.

U.S. Pat. No. 4,452,278 discloses a spectacle line blind with vent which includes a pivotable or rotatable spectacle plate having at one end a conventional full opening providing little obstruction to flow of liquid or gas. On the other end of the spectacle valve plate a blank disc seals one of the inlet and outlet ducts. The opposite side of this blank disc includes spacers having axial and radial openings there between which permit gases to vent to the atmosphere from the other duct.

U.S. Pat. No. 3,891,146 discloses a pipeline apparatus having an economical fitting which makes it possible to carry out certain functions without shutting down the pipeline. Certain installations may require an operating mechanism for operating it. The operating mechanism may be a rather expensive apparatus. In one embodiment of the invention the operating mechanism is attached to the operated structure for only short periods of time and then disconnected therefrom, leaving the operated structure in its functioning condition in relation to the pipeline. Thus a single operating mechanism may be used for operating each of a number of different structures or fittings from time to time as required. The fitting has a seat for temporarily seating the operating mechanism onto the fitting while the fitting is under pressure for performing various equipment changes or other operations of the fitting.

U.S. Pat. No. 3,695,299 discloses a pipe-line blind valve, for blanking off pipe-lines, in which a plate having a hole of the same diameter as the pipe-line is movable from one position, in which the hole is aligned with the bore of the pipe-line, to a second position in which the pipe-line is blocked off, there being a seal to seal between the pipe-line and the plate.

U.S. Pat. No. 2,614,423 discloses a fluid flow orifice structure for arrangement in a conduit to measure the flow of fluid therein, a plate for insertion in the conduit across the flow area through which the fluid in the conduit passes, the plate having a central opening through which the fluid passes and a plurality of passages radially arranged about the center of the plate at spaced intervals, the plate having ports for measuring the impact pressure of the fluid flowing through the conduit, the impact pressure ports positioned in radial series one above the other in the flow area between the center of the plate and the periphery thereof, the impact pressure ports assuming circumferentially spaced circular series of ports around the center of the plate, each radial series of ports communicating with a radially disposed passage, the plate at the periphery thereof having an annular impact pressure channel, each radially disposed passage communicating with the annular impact pressure channel, the plate having a plurality of second passages radially arranged about the center of the plate at spaced intervals and equal in number to the number of first mentioned radially arranged passages, the plate having second ports for measuring the static pressure of the fluid flowing through the conduit and equal in number to the number of the impact pressure ports, the static pressure ports positioned in radial series one above the other in the flow area between the center of the plate and the periphery thereof, the static pressure ports positioned in radial series one above the other in the flow area between the center of the plate and the periphery thereof, the static pressure ports assuming spaced circular series of ports around the center of the plate, each circular series of static pressure ports having a diameter equal to the diameter of a corresponding circular series of impact pressure ports, each radial series of second mentioned ports communicating with a radially disposed second mentioned passage, the plate having an annular static pressure channel, each radially disposed second mentioned passage communicating with the annular static pressure channel, the impact pressure ports and the static pressure ports being open on opposite sides of the plate, respectively, a device for connecting the annular impact pressure channel to one side of a metering mechanism and a second device for connecting the static pressure channel to the metering mechanism.

U.S. Pat. No. 2,462,731 discloses a diversion blind fitting for a pipe line, having flanged joints, the fitting including a body, the body having bolt holes extending laterally therethrough, the bolt holes matching holes in the flanged joints of the pipe line, whereby the body is mounted in the pipe line, a pipe extension to which a pipe is attached, the pipe extension and body having a duct extending therethrough, the duct extending through one side of the body only, and a solid wall on the other side of the body whereby the entire flow through the pipe line is directed through the duct.

U.S. Pat. No. 2,278,849 discloses a line blind for connection in a pipe line including two tubular sections arranged in end to end relation to define a fluid passage and related for relative longitudinal movement, a device for connecting the sections with spaced members of the pipe line, a plate having an imperforate disc-like portion adapted to be inserted between the opposing ends of the sections to extend across the passage, and a device for moving the sections toward and away from one another to clamp the plate between the ends and to free the plate for removal, the device including flanges on the ends of the sections, a rotatable sleeve in surrounding relation to the flanges, the sleeve having a transverse slot in its wall for passing the portion of the plate to and from the position between the ends of the sections, the edge of the plate portion being engageable with the internal surface of the unslotted part of the sleeve to center the plate portion between the ends, an inturned lip on the sleeve having one side bearing against the outer end of the flange of one section, a collar on the section engaging the other side of the lip, and cooperating threads on the sleeve and the flange of the other section.

U.S. Pat. No. 1,164,033 discloses a valve connection mechanism including a pipe cap device, having separable cut off slide receiving members and adapted to receive auxiliary piping and a cut off slide adapted to force the members apart and enter between them to close the pipe outlet, whether the auxiliary piping is engaging the connection mechanism or not.

U.S. Pat. No. 1,150,141 discloses a plate valve which is the combination of two pipes, an angular ring rigidly secured to an end of each pipe, an undercut peripheral flange on each of the rings, a plate located between the ends of adjacent pipes, and a turnbuckle for drawing the pipes into close engagement with the plate, the turn buckle being provided with undercut recesses adapted to engage the flanges, substantially as described.

U.S. Pat. No. 913,866 discloses a valve for the purposes described including a casing and a closure adapted to be detachable held to seat therein by a device carried by the closure and completely housed by the casing when the closure is seated, the closure and holding device being bodily removable from the casing, and the casing being adapted to form a substantially unobstructed coupling in a pipe line when the members are withdrawn.

U.S. Pat. No. Re. 25,052 discloses an additive control device which is a flow control device for disposal in a liquid flow line including a housing consisting of a pair of substantially identical rectangular plates having a constant thickness over a major portion of its area, the plates having smooth inner surface areas facing each other, a circular disk disposed between the plates, the disk having parallel flat surfaces for engagement with the smooth surface of the plates, the width of the plates being less than the diameter of the disk whereby the periphery of the disk will project beyond the side edges of the housing for enabling rotation of the disk, each plate having a liquid flow opening therein adjacent one end thereof with the openings being aligned with each other, tubular adapters connected with each of the plates in alignment with the opening for providing a liquid flow path, the and being adapted to connect to a liquid flow line, the disk having a central opening, each of the plates having and opening therein in alignment with the central opening in the disk, a device extending through the openings in the plate and the central opening in the disk for rotatably retaining the disk and urging the plates towards the disk, the end edge of each plate adjacent the tubular adapter having a laterally extending apertured ear disposed radially outwardly of the periphery of the disk, a clamp device extending through the ears for urging the plates towards each other adjacent the end edge having the tubular adapters thereon, each of the plates having an annular recess in the smooth inner surface area thereof with the recess being disposed in spaced concentric relation to the liquid flow opening, an O-ring seal in each recess, the seal being constructed of resilient material and projecting beyond the surface of the plate for frictional sealing engagement with the disk, the disk having a plurality of circumferentially spaced orifices extending therethrough, the orifices being disposed for alignment with the liquid flow openings and being of different sizes, the spacing between the orifices being greater than the diameter of the O-ring seal whereby only a single orifice can be encircled by the seal, numerical indicia on the disk radially outwardly of the orifices for indicating the size of the orifices, a plurality of knobs on the periphery of the disk for aiding in the rotation thereof, the end edge of each plate remote from the tubular adapters having a notch therein revealing the periphery of the disk and the numerical indicia thereon, a pointer in the notch for alignment with the indicia for indicating alignment of a diametrically opposed orifice with the liquid flow path and the size of that orifice, each of the orifices being countersunk on the downstream side thereof to facilitate escapement of liquid from the orifice, the smooth inner surface area of each plate disposed radially outwardly of the periphery of the disk extending longitudinally inwardly and terminating in flat surfaces disposed adjacent each other for maintaining the plates and disk in generally parallel relation whereby the entire periphery of the O-ring will engage the disk.

SUMMARY OF THE INVENTION

In accordance with the present invention there is provided a pipe blind including a plate for connecting to the end of a pipe, the plate having an outer edge and two parallel faces, the plate having at least one channel therein, the channel being located in the interior of the plate and having an exit port and an entrance port, the entrance port being located on one of the faces of the plate and the exit port being located on the edge of the plate.

The pipe blind of the invention has the advantage of preventing hydrocarbon emissions to the atmosphere.

Furthermore, the pipe blind of the invention has the advantage of being low in cost and easy to install.

BRIEF DESCRIPTION OF THE PREFERRED EMBODIMENTS

Figure 1:
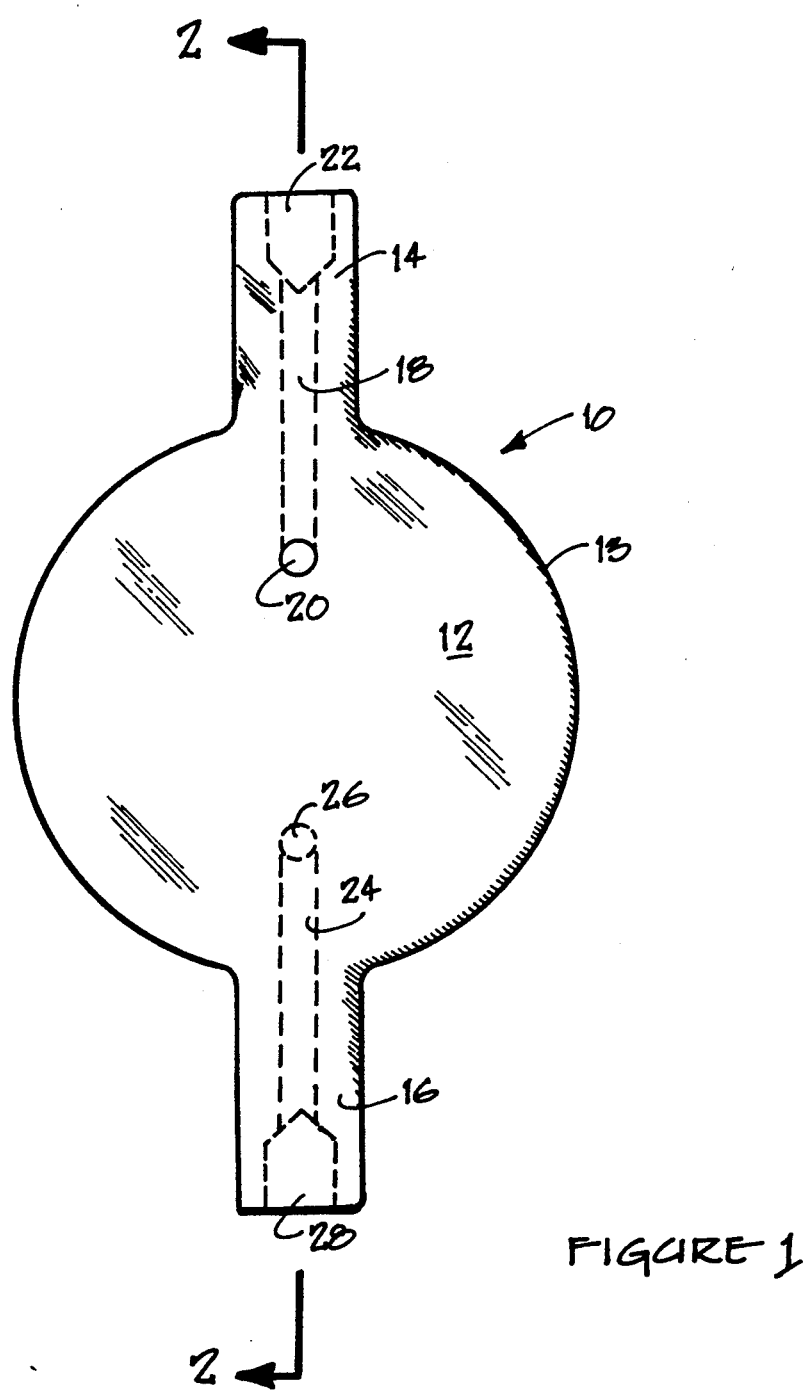
FIG. 1 is a plan view of the pipe blind of the invention.

Referring now to the drawings, in FIG. 1 is a preferred embodiment of the pipe blind of the invention generally indicated by the numeral 10. Pipe blind 10 includes a generally cylindrical plate 12 having a generally cylindrical edge 13.

Extending outwardly from edge 13 are two arms 14 and 16. Arms 14 and 16 preferably lie in the same plane as plate 12 and have the same width.

Figure 2:
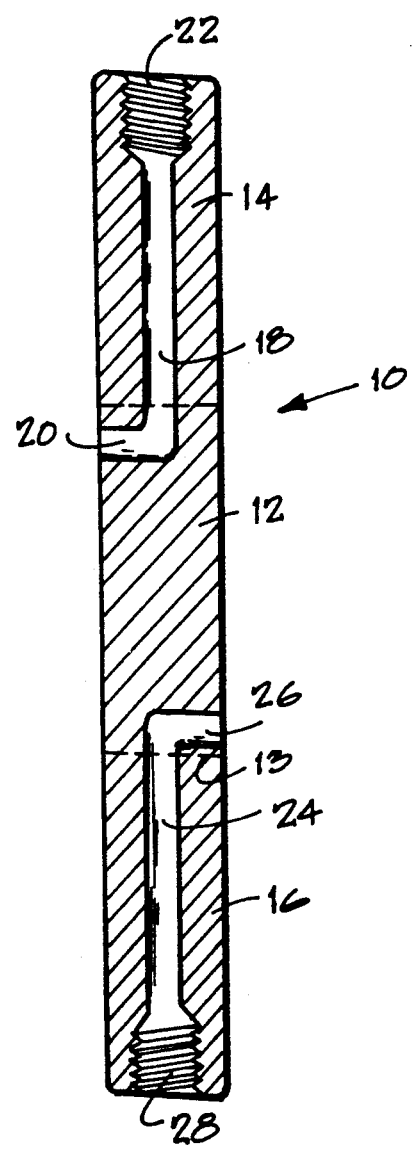
FIG. 2 is a cross-sectional of the pipe blind of the invention taken along lines 2—2 of FIG. 1.

Located in arm 14 is hollow channel 18. Hollow channel 18 has an entrance port 20 and an exit port 22. As can be seen in FIG. 2, exit port 22 may be threaded to receive a valve or other desired fitting.

Located in arm 16 is hollow channel 24. Hollow channel 24 has an entrance port 26 and an exit port 28. As can be seen in FIG. 2, exit port 28 may be threaded to receive a valve or other desired fitting. Preferably, channel 18 is axially aligned with channel 24.

Figure 3:
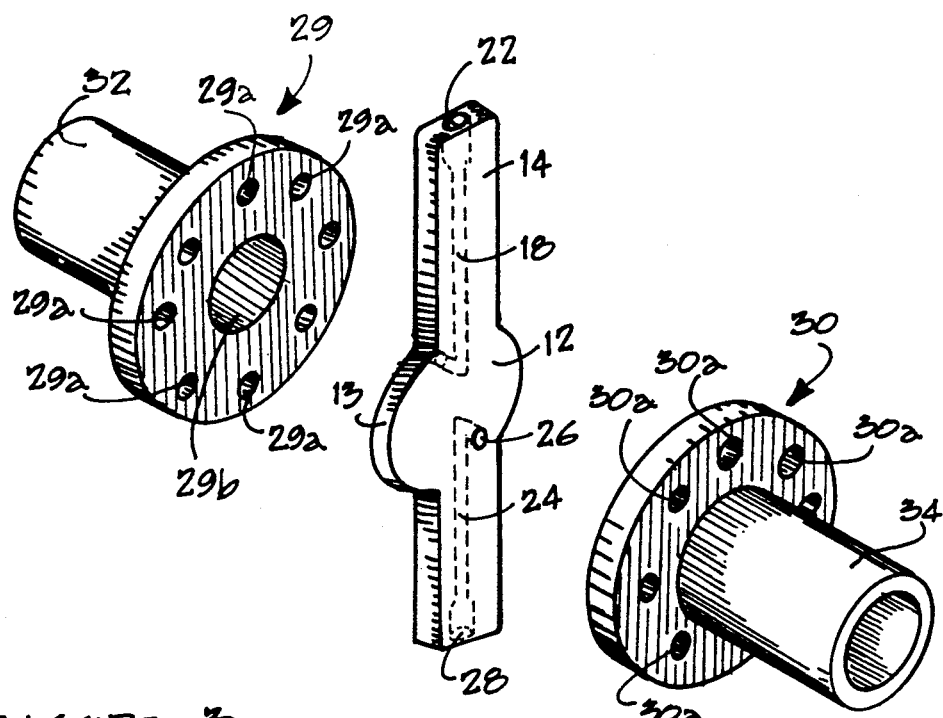
FIG. 3 is an exploded, perspective view of the pipe blind of the invention between two pipes to which the pipe blind is to be connected.

Two flanges are shown in FIG. 3 aligned for fitting to the pipe blind 10 of the invention. One flange is generally indicated by the numeral 29 and the other flange is generally indicated by the numeral 30. Flange 29 has pipe 32 connected thereto and flange 30 has pipe 34 connected thereto.

Figure 4:
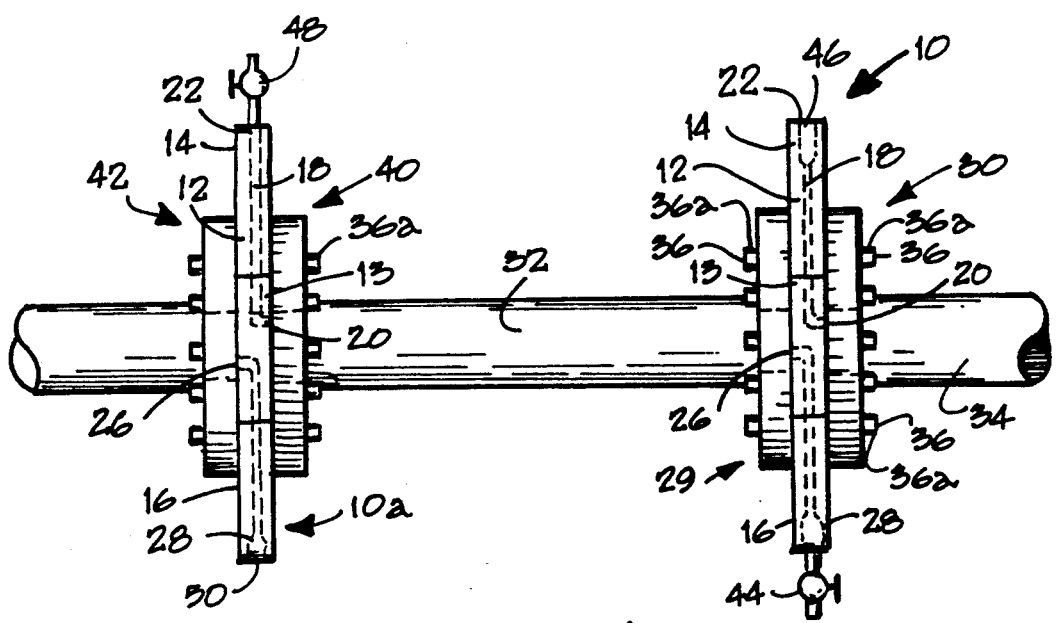
FIG. 4 is a plan view, partially cut away, of three pipes having the pipe blind of the invention connected thereto.

Flange 29 has a plurality of bolt holes 29a therein and flange 30 has a plurality of bolt holes 30a therein aligned with bolt holes 29a. As shown in FIG. 3 and FIG. 4, pipe blind 10 is placed between flanges 29 and 30. Bolts 36 are then inserted into aligned bolt holes 29a and 30a, and nuts 36a are threaded thereon and tightened.

As shown in FIGS. 3 and 4, the diameter of the cylindrical plate 12 is small enough for plate 12 to fit within bolts 36 and large enough to cover opening 29b in flange 29. Furthermore, the entrance ports 20 and 26 are positioned on plate 12 to be located inside of the opening in a flange such as opening 29b in flange 29.

In FIG. 4 is shown two pipe blinds generally indicated by the numerals 10 and 10a. 10a. Pipe blind 10a is identical to pipe blind 10. Pipe blind 10 is connected between flanges 29 and 30, and pipe blind 10a is connected between flanges 40 and 42. Flange 42 is rigidly connected to pipe 38 by welding or the like, and flange 30 is connected to pipe 34 by welding or the like. Flanges 29 and 40 are also connected to the ends of pipe 32 by welding or the like.

As shown in FIG. 4, pipe blind 10 has a valve 44 threaded into exit port 28 and a threaded plug 46 threaded into exit port 22. Pipe blind 10a has a valve 48 threaded into exit port 22 and a threaded plug 50 threaded into exit port 28. Entrance port 26 of pipe blind 10 is located in the interior of pipe 32, and the entrance port 20 of pipe blind 10a is also located in the interior of pipe 32. The entrance port 26 of flange 10a is located in the interior of pipe 38, and the entrance port 20 of pipe blind 10 is located in the interior of pipe 34.

Therefore, utilizing the pipe blinds 10 and 10a connected as shown in FIG. 4, live or pressurized fluids could be located in pipes 38 and 34 while pipe 32 is being repaired such as by welding a hole (not shown) that may occur in pipe 32. Valves 44 and 48 permit hydrostatic testing of pipe 32 after the hole is repaired. Valve 44 can be used to drain fluids from pipe 32 and valve 48 can be opened to vent gases such as air from pipe 32 when pipe 32 is filled with liquids to be tested. Furthermore, gases or liquids removed from pipe 32 through valves 44 and 48 can be directed to reservoirs (not shown) rather than being vented to the atmosphere or ground. Plugs 46 and 50 may be removed as desired and replaced with a valve to remove fluids in pipes 34 and 38.

Figure 5:
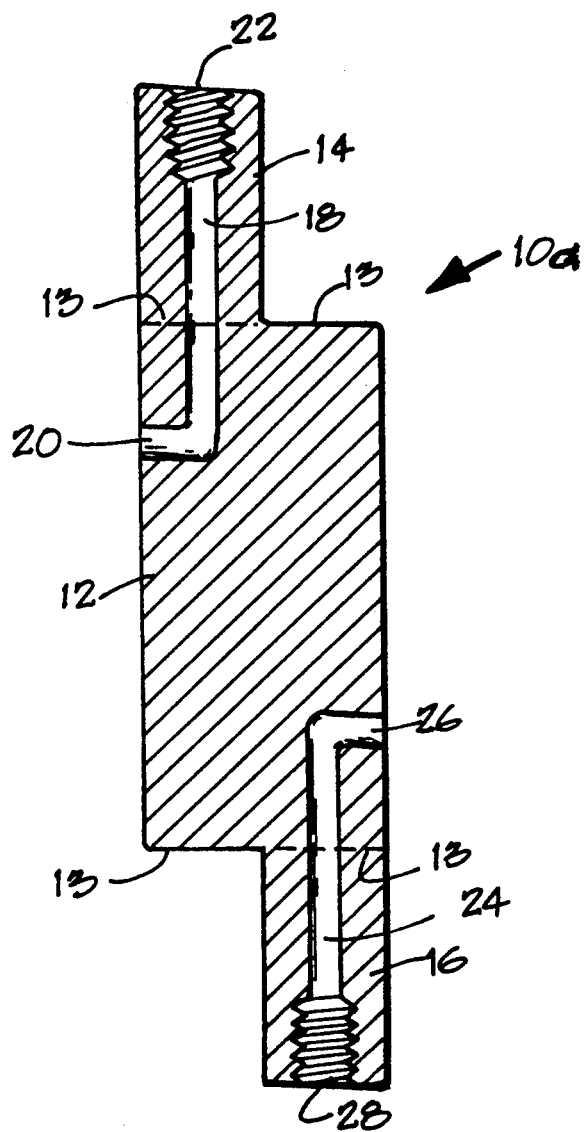
FIG. 5 is a cross-sectional view of an alternate embodiment of the pipe blind of the invention.

In FIG. 5 is shown an alternate embodiment of the pipe blind of the invention generally indicated by the numeral 10c. In the embodiment shown in FIG. 5, the plate 12 is thicker than the plate shown in FIG. 2 and channel 18 is not aligned with channel 24.

Although the preferred embodiments of the invention have been described in detail above, it should be understood that the invention is in no sense limited thereby, and its scope is to be determined by that of the following claims:

What is claimed is:

1. A pipe blind comprising a generally solid cylindrical plate adapted for connection between a first pipe flange and a second pipe flange to block the flow of fluids therebetween, said first pipe flange and said second pipe flange having a plurality of aligned bolt receiving holes located on said flanges in a circular pattern for receipt of bolts to connect said first pipe flange to said second pipe flange, said first pipe flange having a first pipe connected thereto and said second pipe flange having a second pipe connected thereto, said generally cylindrical plate having:

a. an outer generally cylindrical edge larger in diameter than the outer diameter of each of said two pipes and smaller in diameter than said circular pattern of bolt receiving holes,
   b. two generally parallel faces,
   c. a first channel means therein for conveying fluids from the interior of said first pipe to the exterior of said first pipe, said first channel means having an exit port and an entrance port, said entrance port of said first channel means being located on one of the faces of said plate, and said exit port of said first channel means being located on said edge of said plate, said entrance port of said first channel means being located in the interior of said plate in alignment within the interior of said first pipe, and
   d. a second channel means therein for conveying fluids from the interior of a second pipe to the exterior of said second pipe, said second channel means having an exit port and an entrance port, said entrance port of said second channel means being located on one of the faces of said plate, and said exit port of said second channel means being located on said edge of said plate, said entrance port of said second channel means being located in the interior of said plate in alignment with the interior of said second pipe, said plate has a first arm and a second arm which extend outwardly from said generally cylindrical edge in substantially the same plane as the said generally parallel faces, said exit port of said first channel means is located in the said first arm, said first arm extending outwardly from said plate beyond said two flanges, said exit port of said second channel means is located in the said second arm, and said second arm extending outwardly from said plate beyond said two flanges.

2. The pipe blind of claim 1 wherein said first channel and said second channel means are located 180 degrees apart.

3. The pipe blind of claim 1 wherein said first and second channel means are aligned.

4. The pipe blind of claim 1 wherein said two exit ports have thread means therein for receipt of threaded valves.

5. A pipe blind comprising a generally solid cylindrical plate adapted for connecting between a first pipe flange and a second pipe flange to block the flow of fluids therebetween, said first pipe flange and said second pipe flange having a plurality of aligned bolt receiving holes located on said flanges in a circular pattern for receipt of bolts to connect said first pipe flange to said second pipe flange, said first pipe flange having a first pipe connected thereto and said second pipe flange having a second pipe connected thereto, said generally cylindrical plate having:

a. an outer generally cylindrical edge larger in diameter than the outer diameter of each of said two pipes and smaller in diameter than said circular pattern of bolt receiving holes,
  b. two generally parallel faces,
  c. a first arm and a second arm which extend outwardly from said outer generally cylindrical edge, said first arm and said second arm extending outwardly from said plate beyond said two flanges in substantially the same plane as the said generally parallel faces,
  d. a first channel means therein for conveying fluids from the interior of said first pipe to the exterior of said first pipe, said first channel means having an exit port and an entrance port, said entrance port of said first channel means being located on one of the faces of said plate, and said exit port of said first channel means being located on said edge of said plate, said entrance port of said first channel means being located in the interior of said plate in alignment with the interior of said first pipe, said exit port means of said first channel means being located in said first arm, and
  e. a second channel means therein for conveying fluids from the interior of a second pipe to the exterior of said second pipe, said second channel means having an exit port and an entrance port, said entrance port of said second channel means being located on one of the faces of said plate, and said exit port of said second channel means being located on said edge of said plate, said entrance port of said second channel means being located in the interior of said plate in alignment with the interior of said second pipe, said first channel and said second channel means being located about 180 degrees apart, said exit port of said second channel means being located in said second arm.

6. The pipe blind of claim 5 wherein said two channel means are axially aligned.